US010629913B2

United States Patent
Lee et al.

(10) Patent No.: US 10,629,913 B2
(45) Date of Patent: Apr. 21, 2020

(54) ELECTRODE ASSEMBLY HAVING IMPROVED SAFETY, MANUFACTURING METHOD THEREFOR AND ELECTROCHEMICAL ELEMENT COMPRISING ELECTRODE ASSEMBLY

(71) Applicant: LG Chem, Ltd., Seoul (KR)

(72) Inventors: Joo-Sung Lee, Daejeon (KR); Sun-Mi Jin, Daejeon (KR)

(73) Assignee: LG Chem, Ltd. (KR)

( * ) Notice: Subject to any disclaimer, the term of this patent is extended or adjusted under 35 U.S.C. 154(b) by 106 days.

(21) Appl. No.: 15/517,690

(22) PCT Filed: Dec. 8, 2015

(86) PCT No.: PCT/KR2015/013378
§ 371 (c)(1),
(2) Date: Apr. 7, 2017

(87) PCT Pub. No.: WO2016/093589
PCT Pub. Date: Jun. 16, 2016

(65) Prior Publication Data
US 2017/0309915 A1  Oct. 26, 2017

(30) Foreign Application Priority Data

Dec. 8, 2014  (KR) .................. 10-2014-0175285

(51) Int. Cl.
*H01M 4/62* (2006.01)
*H01M 10/0525* (2010.01)
(Continued)

(52) U.S. Cl.
CPC ............. *H01M 4/622* (2013.01); *H01M 2/16* (2013.01); *H01M 2/1646* (2013.01);
(Continued)

(58) Field of Classification Search
CPC .. H01M 4/622; H01M 4/0471; H01M 2/1646; H01M 2/1673; H01M 4/0404;
(Continued)

(56) References Cited

U.S. PATENT DOCUMENTS 6,475,678 B1 * 11/2002 Suzuki ................ H01M 2/1653
429/306
2002/0114993 A1 * 8/2002 Miyaki ................ H01M 4/131
429/137
(Continued)

FOREIGN PATENT DOCUMENTS

DE  112011105969 T5  9/2014
JP  2005353584 A  12/2005
(Continued)

OTHER PUBLICATIONS

Supplementary European Search Report for Application No. EP15868161 dated Aug. 16, 2017.
(Continued)

*Primary Examiner* — Lisa S Park
(74) *Attorney, Agent, or Firm* — Lerner, David, Littenberg, Krumholz & Mentlik, LLP

(57) ABSTRACT

The present invention relates to: an electrode assembly having an inorganic porous coating layer formed on the surface of one electrode of an anode and a cathode and having an organic porous coating layer formed on the surface of the other electrode, and since these porous coating layers exhibit a separator function, the electrode assembly has a more improved heat resistance and safety at high temperature without requiring a separate separator; a manufacturing method therefor; and an electrochemical element comprising the electrode assembly.

8 Claims, 2 Drawing Sheets

(51) Int. Cl.
  *H01M 10/052* (2010.01)
  *H01M 10/058* (2010.01)
  *H01M 10/04* (2006.01)
  *H01M 10/0565* (2010.01)
  *H01M 2/16* (2006.01)
  *H01M 10/0562* (2010.01)
  *H01M 4/04* (2006.01)
  *H01M 10/42* (2006.01)
  *H01M 4/139* (2010.01)
  *H01M 4/13* (2010.01)

(52) U.S. Cl.
  CPC ....... *H01M 2/1653* (2013.01); *H01M 2/1673* (2013.01); *H01M 2/1686* (2013.01); *H01M 4/0404* (2013.01); *H01M 4/0471* (2013.01); *H01M 4/13* (2013.01); *H01M 4/139* (2013.01); *H01M 10/04* (2013.01); *H01M 10/052* (2013.01); *H01M 10/058* (2013.01); *H01M 10/0562* (2013.01); *H01M 10/0565* (2013.01); *H01M 10/4235* (2013.01); *H01M 10/0525* (2013.01)

(58) Field of Classification Search
  CPC ...... H01M 4/13; H01M 4/139; H01M 2/1686; H01M 10/4235; H01M 2/1653; H01M 10/058; H01M 10/04; H01M 10/0562; H01M 10/0565; H01M 2/16; H01M 10/052; H01M 10/0525
  See application file for complete search history.

(56) References Cited

U.S. PATENT DOCUMENTS

| | | | |
|---|---|---|---|
| 2004/0106037 A1* | 6/2004 | Cho | H01M 2/145 429/144 |
| 2005/0118508 A1 | 6/2005 | Yong et al. | |
| 2005/0266150 A1* | 12/2005 | Yong | H01M 2/166 427/58 |
| 2006/0188785 A1 | 8/2006 | Inoue et al. | |
| 2008/0044733 A1 | 2/2008 | Ohata et al. | |
| 2008/0199773 A1* | 8/2008 | Deguchi | H01M 2/166 429/188 |
| 2009/0305141 A1 | 12/2009 | Lee et al. | |
| 2010/0316903 A1 | 12/2010 | Kim et al. | |
| 2011/0045338 A1 | 2/2011 | Bae et al. | |
| 2012/0034509 A1* | 2/2012 | Bae | H01M 2/1653 429/145 |
| 2012/0196191 A1 | 8/2012 | Jeon et al. | |
| 2012/0231321 A1 | 9/2012 | Huang et al. | |
| 2013/0004817 A1 | 1/2013 | Lee et al. | |
| 2013/0199030 A1 | 8/2013 | Song et al. | |
| 2014/0045031 A1* | 2/2014 | Matsumoto | H01M 2/1686 429/144 |
| 2014/0287294 A1 | 9/2014 | Lee et al. | |
| 2015/0050541 A1 | 2/2015 | Kinoshita et al. | |

FOREIGN PATENT DOCUMENTS

| | | |
|---|---|---|
| JP | 2006100051 A | 4/2006 |
| JP | 2012033907 A | 2/2012 |
| JP | 2013084393 A | 5/2013 |
| JP | 2014179330 A | 9/2014 |
| KR | 20050043674 A | 5/2005 |
| KR | 20070092621 A | 9/2007 |
| KR | 20120108212 A | 10/2012 |
| KR | 20130091174 A | 8/2013 |
| WO | 2014071144 A1 | 5/2014 |

OTHER PUBLICATIONS

International Search Report from PCT/KR2015/013378, dated Apr. 6, 2016.

* cited by examiner

ELECTRODE ASSEMBLY HAVING IMPROVED SAFETY, MANUFACTURING METHOD THEREFOR AND ELECTROCHEMICAL ELEMENT COMPRISING ELECTRODE ASSEMBLY

CROSS REFERENCE TO RELATED APPLICATIONS

The present application is a national phase entry under 35 U.S.C. § 371 of International Application No. PCT/KR2015/013378, filed Dec. 8, 2015, published in Korean, which claims priority to and the benefits of Korean Patent Application No. 10-2014-0175285 filed with the Korean Intellectual Property Office on Dec. 8, 2014, the entire contents of which are incorporated herein by reference.

TECHNICAL FIELD

The present invention relates to an electrode assembly with improved safety, a manufacturing method therefor and an electrochemical device including the electrode assembly, and more particularly, to an electrode assembly with improved heat resistance and safety at high temperature in which an inorganic porous coating layer is formed on the surface of an electrode active material layer of one of a positive electrode and a negative electrode and an organic porous coating layer is formed on the surface of the other electrode active material layer, and the porous coating layers act as a separator, eliminating the need for a separator, and an a manufacturing method therefor and an electrochemical device including the electrode assembly.

BACKGROUND ART

Recently, there is an increasing interest in energy storage technology day by day. As the application field of energy storage technology has been extended to mobile phones, camcorders, laptop computers, and even electric cars, many efforts have been made on research and development of electrochemical devices. In this aspect, electrochemical devices gain the most attention, and among them, attention is focusing on development of secondary batteries that can be recharged. More recently, in developing such batteries, research and development of new electrode and battery designs is being carried out to improve the capacity density and specific energy.

Among currently available secondary batteries, lithium ion batteries developed in the early 1990's have drawn particular attention due to their advantages in terms of higher operating voltages and much higher energy densities than traditional batteries using an aqueous electrolyte solution, for example, Ni—MH, Ni—Cd, and lead-acid batteries. However, lithium ion batteries have safety issues, such as fires and explosions, caused by the use of organic electrolytes, and their disadvantage is complex manufacturing.

It is very important to assess and ensure the safety of batteries. The most important consideration is that batteries shall not cause damage to users in the event of malfunction, and for this purpose, fire and smoke emission in batteries is strictly restricted by safety standards for batteries. Accordingly, many solutions are proposed to solve the safety problem.

For example, lithium ion batteries and lithium ion polymer batteries generally have a polyolefin based separator to prevent a short circuit between a positive electrode and a negative electrode. However, the downside of the polyolefin based separator is that the separator returns to its original size by thermal contraction at high temperature due to the properties of the separator material, for example, the properties of polyolefins that generally melt at 200° C. or less and processing properties, for example, property to undergo a stretching process for adjusting the pore size and porosity. Accordingly, when battery temperature increases due to internal/external impacts, the separator contracts or melts and there is a high likelihood that a short circuit will occur between positive and negative electrodes, hence the batteries have a high risk of explosions caused by emission of electrical energy.

To solve the problem, a composite separator having an inorganic coating layer formed on a polyolefin based film was proposed, but the composite separator needs improvements in terms of bonding between the separator and the electrode and the thickness.

Recently, an electrode that is surface-coated with inorganic particles and acts as a separator is proposed. However, when a separator function is imparted by forming an inorganic coating layer on the electrode surface, shut down does not take place at high temperature, leading to thermal runaway.

DISCLOSURE

Technical Problem

The present disclosure is directed to providing an electrode assembly that is tightly adhered at the electrode interface, is less likely to have thermal contraction, and provides a shut down function, and a manufacturing method therefor and an electrochemical device including the electrode assembly.

Rather, the technical object the present disclosure intends to achieve is not limited to the above object, and other technical objects not stated above will be easily understood by those skilled in the art from the following detailed description.

Technical Solution

To achieve the object, in an embodiment of the present disclosure, there is provided an electrode assembly including a positive electrode composed of a positive electrode current collector, a positive electrode active material layer and a porous coating layer stacked in a sequential order, and a negative electrode composed of a negative electrode current collector, a negative electrode active material layer and a porous coating layer stacked in a sequential order, wherein one of the porous coating layer at the positive electrode and the porous coating layer at the negative electrode is an organic porous coating layer, and the other is an inorganic porous coating layer, and the organic porous coating layer and the inorganic porous coating layer face each other.

Organic particles that make up the organic porous coating layer may have a melting point of 180° C. or less.

The organic porous coating layer may include particles formed from at least one selected from the group consisting of high density polyethylene, low density polyethylene, linear low density polyethylene, polypropylene, high crystalline polypropylene, polyethylene-propylene copolymer, polyethylene-butylene copolymer, polyethylene-hexene copolymer, polyethylene-octene copolymer, polystyrene-butylene-styrene copolymer, polystyrene-ethylene-butylene-styrene copolymer, polystyrene, polyphenylene oxide, polysulfone, polycarbonate, polyester, polyamide, polyurethane, polyacrylate, polyvinylidene chloride, polyvinylidene fluoride, polysiloxane, polyolefin ionomer, polymethyl pentene, hydrogenated oligocyclopentadiene (HOCP), and their derivatives.

The organic porous coating layer may be formed in an amount of between 0.1 and 7 g/m$^2$ over the entire surface of the active material layer of the positive electrode or the negative electrode. Preferably, the organic porous coating layer is formed with a uniform thickness in an amount of between 0.1 and 7 g/m$^2$ over the entire surface of the active material layer of the positive electrode or the negative electrode, to shut down the battery in the event of abnormal heat generation.

The inorganic porous coating layer may include inorganic particles having a dielectric constant of 5 or higher, inorganic particles having an ability to transport lithium ions, or their mixtures.

The inorganic particles having a dielectric constant of 5 or higher may be $BaTiO_3$, $Pb(Zr,Ti)O_3$ (PZT), $Pb_{1-x}La_xZr_{1-y}Ti_yO_3$ (PLZT), $PB(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, or their mixtures.

The inorganic particles having an ability to transport lithium ions may be lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ based glass ($Li_xSi_yS_z$, 0<x<3, 0<y<2, 0<z<4), $P_2S_5$ based glass ($Li_xP_yS_z$, 0<x<3, 0<y<3, 0<z<7), or their mixtures.

The inorganic porous coating layer may be formed in an amount of between 1 and 30 g/m$^2$ on a surface of the electrode.

The inorganic particles may have a diameter in a range of between 0.1 and 1.0 μm, and the organic particles may have a diameter in a range of between 0.05 and 1.0 μm. Thereby lithium ions can be smoothly moved, and close adhesion of the inorganic porous coating layer and the organic porous coating layer can be achieved as well.

According to another embodiment of the present disclosure, there is provided an electrochemical device including the aforesaid electrode assembly, and the electrochemical device may be a lithium secondary battery.

Furthermore, according to still another embodiment of the present disclosure, there is provided a method for manufacturing an electrode assembly including (a) applying a mixed electrode slurry to a current collector to manufacture an electrode having an active material layer, (b) preparing a slurry including inorganic particles, and coating the slurry on a surface of an electrode active material layer and drying to form an inorganic porous coating layer, (c) preparing a slurry including organic particles, and coating the slurry on a surface of another electrode active material layer and drying to form an organic porous coating layer, and (d) stacking the electrodes such that the inorganic porous coating layer and the organic porous coating layer face each other.

After the step (b) or (c) is performed and before the step (d) is performed, a lamination process may be performed for bonding between the porous coating layer and the electrode.

Advantageous Effects

The electrode assembly according to an embodiment of the present disclosure eliminates the need for a general separator because the electrode acts as a separator.

Furthermore, due to the presence of each of the inorganic porous coating layer and the organic porous coating layer between the positive electrode and the negative electrode, the effects of the inorganic porous coating layer on the prevention of thermal contraction and a short circuit, and the effects of the organic porous coating layer on the shut down when overheated are all provided.

In addition, the mechanical properties and ionic conductivity of the inorganic porous coating layer and the organic porous coating layer are superior, contributing to the performance improvement of electrochemical devices.

BRIEF DESCRIPTION OF DRAWINGS

The accompanying drawings illustrate a preferred embodiment of the present disclosure and together with the foregoing description, serve to provide further understanding of the technical feature of the present disclosure. However, the present disclosure is not construed as being limited to the drawings.

BEST MODE FOR CARRYING OUT THE INVENTION

Figure 1:
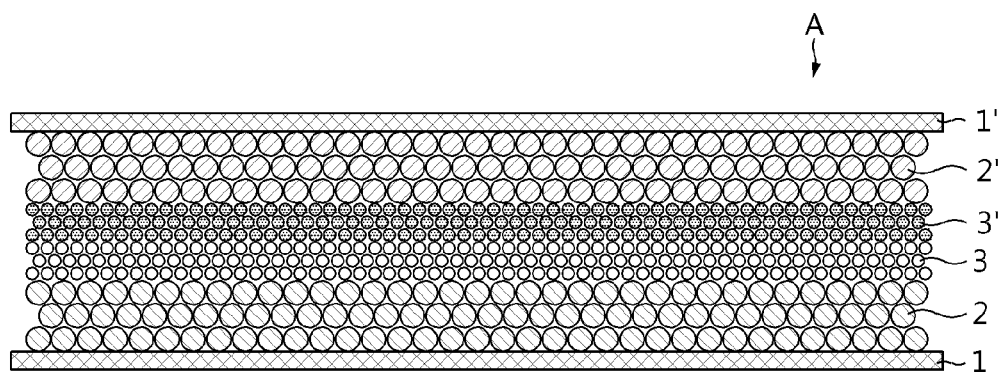
FIG. 1 is a schematic diagram showing the cross section of an electrode assembly according to an embodiment of the present disclosure, in which an inorganic porous coating layer and an organic porous coating layer are each formed on the surface of a positive electrode active material layer or the surface of a negative electrode active material layer, and the inorganic porous coating layer and the organic porous coating layer face each other.

Hereinafter, the preferred embodiments of the present disclosure will be described in detail with reference to the accompanying drawings. Prior to the description, it should be understood that the terms used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation. Therefore, the embodiments described in the specification and illustration shown in the drawings are just a preferable example for the purpose of illustrations only, not intended to represent all the technical aspects of the present disclosure, and it should be understood that a variety of alternative equivalents and modifications could be made thereto at the time the application is filed.

In an embodiment of the present disclosure, there is provided an electrode assembly in which an inorganic porous coating layer or an organic porous coating layer are formed on the surface of each of a positive electrode and a negative electrode and the inorganic porous coating layer and the organic porous coating layer are assembled facing each other, and an electrochemical device including the electrode assembly.

For example, referring to FIG. 1, an electrode assembly A is considered, and it is configured such that a negative electrode active material layer 2 is formed on a negative electrode current collector 1, an organic porous coating layer 3 is formed on the surface of the negative electrode active material layer 2, a positive electrode active material layer 2' is formed on a positive electrode current collector 1', an inorganic porous coating layer 3' is formed on the surface of the positive electrode active material layer 2', and the organic porous coating layer 3 and the inorganic porous coating layer 3' face each other.

Furthermore, the present disclosure provides a method for manufacturing an electrode assembly including (a) applying a mixed electrode slurry to a current collector to manufacture an electrode, (b) preparing a slurry including inorganic particles, and coating the slurry on the surface of an electrode active material layer and drying to form an inorganic porous coating layer, (c) preparing a slurry including organic particles, and coating the slurry on the surface of another electrode active material layer and drying to form an organic porous coating layer, and (d) stacking the electrodes such that the inorganic porous coating layer and the organic porous coating layer face each other.

Hereinafter, the present disclosure is described in detail.

The electrode assembly according to an embodiment of the present disclosure is characterized by providing an integrated electrode of new concept integrating the function of a general separator serving as a spacer which allows ions to pass through while preventing the electronic contact between the positive electrode and the negative electrode and the function of an electrode where reversible lithium intercalation and deintercalation takes place.

The electrode assembly of an integrated separator/electrode type according to an embodiment of the present disclosure has an inorganic porous coating layer or an organic porous coating layer formed on the surface of the positive electrode having the positive electrode active material layer. In this instance, when an inorganic porous coating layer is formed on the surface of the positive electrode active material layer, an organic porous coating layer is formed on the surface of the negative electrode active material layer, and when an organic porous coating layer is formed on the surface of the positive electrode active material layer, an inorganic porous coating layer is formed on the surface of the negative electrode active material layer. Furthermore, the inorganic porous coating layer and the organic porous coating layer face each other.

The organic porous coating layer and the inorganic porous coating layer formed on the surface of the active material layers of each of the positive electrode and the negative electrode may be stacked facing each other without forming a separate binder layer.

The organic porous coating layer is free of inorganic particles. If inorganic particles are included in the organic porous coating layer, the battery does not fully shut down when overheated, failing to ensure safety and causing a reduction in bonding with the inorganic porous coating layer.

According to an embodiment of the present disclosure, the inorganic porous coating layer may have a uniform pore structure in which inorganic particles are packed closely and held together by organic binder polymer to form 'interstitial volume' structure between the inorganic particles. Likewise, the organic porous coating layer may have a uniform pore structure because interstitial volume structure is formed between organic particles.

In an embodiment of the present disclosure, one of the components that make up the organic porous coating layer is organic particles.

Preferably, the organic particles shut down by pore blocking when the temperature of the battery is abnormally high. In this aspect, the organic particles preferably has a melting point of between 100 and 180° C. If the organic particles have a melting point of less than 100° C., the shutdown temperature of the organic porous coating layer is too low, and when an electrochemical device is repeatedly used, an unintentional shut down takes place, causing an increase of impedance. On the contrary, if the melting point of the organic particles is higher than 180° C., the shut down function is not fully obtained, and thermal runaway occurs when the temperature increases.

The organic particles have a particle shape having the mean particle size D50 of 0.01-5.0 µm, more preferably the mean particle size D50 of 0.03-3.0 µm, and particularly preferably the mean particle size D50 of 0.05-1.0 µm, in terms of allowing an electrolyte solution to penetrate into the organic particles as an active material layer and preventing the impedance increase. Furthermore, it is desirable that the particle shape is spherical in terms of allowing for a uniform pore structure due to 'interstitial volume' structure formed between organic particles packed closely and held together by organic binder polymer. Here, it should be understood that 'spherical' as used herein does not refer to only a perfect spherical shape, and encompasses a particle shape which is close to a spherical shape or capable of forming 'interstitial volumes' or pores. Furthermore, to maintain the particle shape even after applied on the electrode, the organic particles should not be swollen or dispersed in an organic solvent.

Non-limiting examples of the organic particles include, but are not limited to, particles formed from at least one selected from the group consisting of high density polyethylene, low density polyethylene, linear low density polyethylene, polypropylene, high crystalline polypropylene, polyethylene-propylene copolymer, polyethylene-butylene copolymer, polyethylene-hexene copolymer, polyethylene-octene copolymer, polystyrene-butylene-styrene copolymer, polystyrene-ethylene-butylene-styrene copolymer, polymethyl methacrylate, ethylene acrylate copolymer, polyvinyl chloride, polystyrene, polyphenylene oxide, polysulfone, polycarbonate, polyester, polyamide, polyurethane, polyacrylate, polyvinylidene chloride, polyvinylidene fluoride, polysiloxane, polyolefin ionomer, polymethyl pentene, hydrogenated oligocyclopentadiene (HOCP), and their derivatives.

The organic porous coating layer may be formed over the entire electrode surface in an amount of between 0.1 and 7 g/m², and when the amount used lies within the numerical range, it is possible to ensure safety of the battery at high temperature while not causing significant degradation of the battery performance.

In an embodiment of the present disclosure, when the positive electrode and the negative electrode are bonded together, the organic porous coating layer and the inorganic porous coating layer are coated on the active material layers of each of the positive electrode and the negative electrode such that the organic porous coating layer and the inorganic porous coating layer face each other.

One of the components that make up the inorganic porous coating layer is inorganic particles, and the inorganic particles are not particularly limited so long as they can prevent a short circuit between the negative electrode and the positive electrode and are electrochemically stable. That is, the inorganic particles that can be used in the present disclosure are not particularly limited if they do not cause any oxidation and/or reduction reaction in the operating voltage range (for example, 0-5V for Li/Li$^+$) of the battery used. Particularly, the use of inorganic particles having the ability to transport ions increases ionic conductivity in electrochemical devices, contributing to the performance improvement, and accordingly, those having ionic conductivity that is as high as possible are desirable. Furthermore, the inorganic particles having high density are difficult to disperse in the coating process and have a problem of increased weight in the manufacture of the battery, and accordingly, those having density that is as low as possible are desirable. Furthermore, the use of an inorganic material having a high dielectric constant contributes to the increase in dissolution rate of electrolyte salts, for example, lithium salts, in a liquid electrolyte, thereby increasing ionic conductivity of an electrolyte solution.

By the foregoing reasons, the inorganic particles are preferably inorganic particles having a dielectric constant of 5 or higher, inorganic particles having the ability to transport lithium ions, or their mixtures.

Non-limiting examples of the inorganic particles having a dielectric constant of 5 or higher include BaTiO3, Pb(Zr,Ti)O$_3$ (PZT), Pb$_{1-x}$La$_x$Zr$_{1-y}$Ti$_y$O$_3$ (PLZT), PB(Mg$_{1/3}$Nb$_{2/3}$)O$_3$—PbTiO$_3$ (PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$, or their mixtures.

The inorganic particles having the ability to transport lithium ions as used herein refer to inorganic particles which contain lithium atoms but do not store lithium, and have a function to move lithium ions, and because the inorganic particles having the ability to transport lithium ions can transfer and move lithium ions due to a kind of defect present in the particle structure, it is possible to improve lithium ionic conductivity in the battery, contributing to the improvement of the battery performance.

Non-limiting examples of the inorganic particles having the ability to transport lithium ions include lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ based glass (0<x<4, 0<y<13) such as 14Li$_2$O—9Al$_2$O$_3$-38TiO$_2$-39P$_2$O$_5$, lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5) such as Li$_{3.25}$Ge$_{0.25}$P$_{0.75}$S$_4$, lithium nitride (Li$_x$N$_y$, 0<x<4, 0<y<2) such as Li$_3$N, SiS$_2$ based glass (Li$_x$Si$_y$S$_z$, 0<x<3, 0<y<2, 0<z<4) such as Li$_3$PO$_4$—Li$_2$S—SiS$_2$, P$_2$S$_5$ based glass (Li$_x$P$_y$S$_z$, 0<x<3, 0<y<3, 0<z<7) such as such as LiI—Li$_2$S—P$_2$S$_5$, or their mixtures.

The inorganic particles having high dielectric properties, i.e., Pb(Zr,Ti)O$_3$ (PZT), Pb$_{1-x}$La$_x$Zr$_{1-y}$Ti$_y$O$_3$ (PLZT), PB(Mg$_{1/3}$Nb$_{2/3}$)O$_3$—PbTiO$_3$ (PMN-PT), and hafnia (HfO$_2$) exhibit high dielectric properties of a dielectric constant of 100 or higher, as well as piezoelectricity that is the appearance of a potential difference across two surfaces due to electric charge generated when stretched or compressed by the application of predetermined pressure, thereby preventing the occurrence of an internal short circuit between two electrodes caused by external impacts, ultimately contributing to the improvement of safety of the battery. Furthermore, when the high dielectric constant inorganic particles and the inorganic particles having the ability to transport lithium ions are used in combination, their synergistic effect can be greatly magnified.

There is no limitation on the size of the inorganic particles, but for a coating layer formed at a uniform thickness and optimal porosity, the size of the inorganic particles preferably ranges from 0.001 to 10 µm or from 0.1 to 1.0 µm if possible. When the size of the inorganic particles is less than the lower limit, dispersion reduces, making it difficult to adjust the properties of the porous coating layer, and when the size of the inorganic particles exceeds the upper limit, a porous coating layer formed with the same solids content is thicker and has poorer mechanical properties, and there is a high probability that an internal short circuit will occur during charging or discharging of the battery due to too large pore size due to too large pore size.

The inorganic porous coating layer may be formed on the electrode surface in an amount of between 1 and 30 g/m$^2$, and it is possible to ensure safety of the battery at high temperature while not causing significant degradation of the battery performance within the range.

One of the components that make up the organic porous coating layer and/or the inorganic porous coating layer may include organic binder polymer commonly used in the art.

When put in a solvent, the organic binder polymer is swollen or dispersed to form bonds between the inorganic particles, between the organic particles, between the inorganic particles and the electrode current collector, or between the organic particles and the electrode current collector.

Furthermore, the organic binder polymer may include organic binder polymers whose glass transition temperature T$_g$ is as low as possible, and preferably those having the glass transition temperature in the range of between −200 and 200° C. This is because it can improve the mechanical properties of a final coating layer such as flexibility and elasticity. The organic binder polymer acts as a binder to connect and immobilize between the inorganic particles, between the organic particles, between the surfaces of the inorganic particles/organic particles and the electrode active material particles, and some pores in the electrode, thereby preventing the degradation of the mechanical properties of the electrode finally manufactured.

The organic binder polymer does not need to have the ability to transport ions, but the use of the organic binder polymer having the ability to transport ions can further improve the performance of electrochemical devices. Accordingly, the organic binder polymer preferably has a dielectric constant that is as high as possible.

Because in practice, the dissolution of salts in an electrolyte solution relies on the dielectric constant of the solvent of the electrolyte solution, as the dielectric constant of the organic binder polymer increases, the dissolution of salts in the electrolyte of the present disclosure is improved. The dielectric constant of the organic binder polymer may range between 1.0 and 100 (measured at frequency=1 kHz), and particularly preferably 10 or higher.

Furthermore, the organic binder polymer may have a property to exhibit high degree of swelling in an electrolyte solution by gelation when swollen in a liquid electrolyte solution.

Non-limiting examples of the organic binder polymer that can be used in the present disclosure include polyethylene oxide, polyvinylidene fluoride, polyvinylidene fluoride-hexafluoropropylene, polyvinylidene fluoride-trichloroethylene, polymethylmethacrylate, polyacrylonitrile, polyacrylonitrile-styrene copolymer, polyvinylchloride (PVC), polyvinylpyrrolidone, polyvinylacetate, polyethylene vinyl acetate copolymer, gelatin, cyanoethylpullulan, cyanoethylpolyvinylalcohol, cyanoethylcellulose, cyanoethylsucrose, pullulan, cellulose acetate, cellulose acetate butyrate, cellulose acetate propionate, polyethyleneglycol, glyme, polyethyleneglycol dimethylether, carboxymethyl cellulose, or their mixtures.

There is no limitation on the composition of the inorganic particles/organic particles and the organic binder polymer in the inorganic porous coating layer or the organic porous coating layer formed on the electrode according to the present disclosure, and the composition of the inorganic particles/organic particles and the organic binder polymer can be adjusted based on the thickness and structure of a final coating layer. More specifically, it is preferred to adjust the ingredient ratio of the inorganic particles/organic particles and the organic binder polymer within the weight ratio range of between 10:90 and 99:1, preferably the weight ratio range of between 50:50 and 98:2. When the ingredient ratio of the inorganic particles/organic particles and the organic binder polymer is less than 10:90 weight ratio, too high content of organic binder polymer reduces the interstitial volume formed between the inorganic particles/organic particles and consequentially the pore size and porosity, causing the final battery performance to degrade. Furthermore, a porous coating layer may be formed in which bonds are formed between the inorganic particles or the organic particles without using organic binder polymer according to the manufacturing method and/or the use of the battery.

There is no limitation on the thickness of a porous coating layer formed by coating an inorganic particle slurry/organic particle slurry on the electrode surface, but the thickness of the porous coating layer can be adjusted in consideration of the battery performance, and thickness adjustment is independently accomplished in each of the positive electrode and the negative electrode. To reduce the internal resistance of the battery, the present disclosure preferably adjusts the thickness of the coating layer within the range of between 1 and 100 μm, and more preferably the range of between 1 and 30 μm.

Furthermore, the pore size and porosity of the porous coating layer is an important factor affecting ionic conductivity adjustment. In an embodiment of the present disclosure, the pore size and porosity of the porous coating layer preferably ranges from 0.001 to 10 μm, and from 10 to 95%, respectively.

The porous coating layer formed on the electrode according to an embodiment of the present disclosure may further include additive.

Hereinafter, according to an embodiment, the manufacturing method includes (a) applying a mixed electrode slurry to a current collector to manufacture an electrode, (b) preparing a slurry for forming a porous coating layer including inorganic particles, and coating the slurry on the surface of one electrode active material layer and drying to form an inorganic porous coating layer, (c) preparing a slurry for forming a porous coating layer including organic particles, and coating the slurry on the surface of the other electrode active material layer and drying to form an organic porous coating layer, and (d) stacking the electrodes such that the inorganic porous coating layer and the organic porous coating layer formed on the electrodes face each other.

After forming the inorganic porous coating layer on the electrode surface at the step (b) and/or after forming the organic porous coating layer on the other electrode surface at the step (c), a lamination process may be performed before the step (d) if necessary, to form bonds between the porous coating layer and the electrode. The condition under which the lamination is performed may include conditions commonly performed in the art. For example, the lamination may be performed at temperature in the range of between 30 and 150° C. and/or pressure in the range of between 98,000 and 490,000 N/cm$^2$.

The solvent used in the porous coating layer slurry preferably has a solubility index similar to that of organic binder polymer to use, and a low boiling point. This is because it achieves uniform mixing, and facilitates the subsequent removal of the solvent. Non-limiting examples of the solvent include acetone, tetrahydrofuran, methylene chloride, chloroform, dimethylformamide, N-methyl-2-pyrrolidone (NMP), cyclohexane, water, or their mixtures.

Furthermore, it is preferred to perform pulverization of the inorganic particles/organic particles after the inorganic particles/organic particles are added to each solvent. In this instance, an optimal pulverization time is from 1 to 20 hours, and the pulverized inorganic particles/organic particles preferably have the aforesaid particle size. The pulverization method includes common methods, and particularly preferably a ball mill method.

A method for coating the inorganic porous coating layer slurry or the organic porous coating layer slurry on the surface of each electrode active material layer includes common methods known in the art, for example, dip coating, die coating, roll coating, comma coating, or their combinations.

In this instance, the porous coating layer slurry may be applied after the solvent in the electrode active material layer is fully dried, or the porous coating layer slurry may be applied when the active material layer is sticky due to the solvent remaining in the electrode active material layer, to ensure stronger bonds between the active material layer and the porous coating layer.

Below is a further detailed description of the features of the porous coating layer.

1) The organic porous coating layer and the inorganic porous coating layer formed on the electrodes prevent a short circuit between the positive electrode and the negative electrode, and improve the safety of the battery by virtue of a shut down function exerted by the organic porous coating layer when the battery temperature is abnormally high, and the coating layers have the ability to transport an electrolyte due to the pore structure formed therein. That is, they act as a separator.

2) Conventional polyolefin based separators have a melting point of 120-140° C. and are subject to thermal contraction at high temperature, but in an embodiment of the present disclosure, the inorganic porous coating layer is present between the positive electrode and the negative electrode, and thermal contraction at high temperature caused by the heat resistance of the inorganic particles can be suppressed. Accordingly, an electrochemical device using the electrode having the inorganic porous coating layer does not experience reduced safety caused by an internal short circuit between the positive electrode/the negative electrode even under severe conditions such as high temperature and overcharge, and has very safe properties as compared to conventional batteries.

3) As opposed to conventional free standing film type separators or polymer electrolytes that are manufactured in the form of a free standing film including inorganic particles and binder polymer without a porous substrate and interposed and assembled between positive and negative electrodes, the porous coating layer is directly formed on the electrode surface, achieving mechanically strong bonds between the coating layer and the electrode. Accordingly, the mechanical property problem of conventional free standing film type separators that are brittle and prone to fracture can be solved, and interface adhesion between the electrode and the coating layer is improved, resulting in reduced interfacial resistance.

4) The pore size and porosity of the porous coating layer can be adjusted by varying the particle size of the inorganic particles/organic particles, or in some cases, the ingredient ratio of the inorganic particles/organic particles and the organic binder polymer. The pore structure is filled with a liquid electrolyte that will be injected later, providing an effect on the significant reduction in interfacial resistance between the inorganic particles, between the organic particles, or between the inorganic particles and the organic binder polymer and the organic particles and the organic binder polymer.

5) When organic binder polymer is used in the porous coating layer, the organic binder polymer may be swollen or dissolved by an electrolyte solution, and thus, an electrolyte solution injected after the battery assembly permeates through the organic binder polymer, and the organic binder polymer holding the absorbed electrolyte solution has the ability to transport electrolyte ions. Accordingly, the performance of electrochemical devices can be improved as compared to conventional organic/inorganic composite electrolytes. Furthermore, the organic binder polymer has very high affinity to an electrolyte solution, and thus the electrode coated with the organic binder polymer increases in affinity to an electrolyte solution, and improved performance will be expected.

6) The manufacture of integrated electrode/separator can simplify the manufacturing process of electrochemical devices.

7) The porous coating layer is formed by a coating method, making it easy to adjust the thickness, and making it possible to manufacture not only a thin film of 10 μm or less but also a thick film.

In an embodiment of the present disclosure, in an electrochemical device including a positive electrode, a negative electrode, and an electrolyte solution, there is provided an electrochemical device including an electrode assembly composed of electrodes having a porous coating layer of inorganic particles/organic particles as an alternative to a separator on the surface of each of the positive electrode and the negative electrode.

The electrochemical device includes any type of device that undergoes electrochemical reactions, for example, any type of primary battery, secondary battery, fuel cell, solar cell, or capacitor.

In an example of a method for manufacturing an electrochemical device using the electrodes manufactured as described above, a general separator is not used and only electrodes having a porous coating layer manufactured as described above are used, and an electrochemical device may be manufactured by assembling the electrodes through a winding or stacking process and injecting an electrolyte solution.

The electrode having the porous coating layer according to an embodiment of the present disclosure is not limited to a particular type, and may include electrodes manufactured such that an electrode active material is bonded to an electrode current collector by common methods known in the art. Of the electrode active material, non-limiting examples of the positive electrode active material include common positive electrode active materials used in the positive electrode of conventional electrochemical devices, and particularly preferably lithium intercalation materials such as lithium manganese oxide, lithium cobalt oxide, lithium nickel oxide, lithium iron oxide, or composite oxide thereof.

Non-limiting examples of the negative electrode active material include common negative electrode active materials used in the negative electrode of conventional electrochemical devices, and particularly preferably lithium intercalation materials such as lithium metal or lithium alloy, carbon, petroleum coke, activated carbon, graphite, or other carbons.

Non-limiting examples of the positive electrode current collector include foils manufactured by aluminum, nickel or their combinations, and non-limiting examples of the negative electrode current collector include foils manufactured by copper, gold, nickel or copper alloy, or their combinations.

The electrolyte solution that can be used in the present disclosure includes, but is not limited to, electrolyte solutions in which a salt is dissolved or dissociated in an organic solvent, the salt having a structure represented by, for example, $A^+B^-$, wherein $A^+$ is an alkali metal cation such as $Li^+$, $Na^+$, $K^+$, or their combinations, and W is an anion such as $PF_6^-$ $BF_4^-$ $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2SO_2)_3^-$, or their combinations, and the organic solvent includes propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or their mixtures.

In the present disclosure, the injection of the electrolyte solution may be performed in any suitable step of a manufacturing process of an electrochemical device based on a manufacturing process and required properties of a final product. That is, the injection of the electrolyte solution may be performed before assembly of the electrochemical device or in the final step of assembly of the electrochemical device.

Furthermore, the electrode itself acts as a separator, eliminating the need for a separate separator used in conventional batteries.

An electrochemical device manufactured by the method is preferably a lithium secondary battery, and the lithium secondary battery includes lithium metal secondary batteries, lithium ion secondary batteries, lithium polymer secondary batteries, or lithium ion polymer secondary batteries.

MODE FOR CARRYING OUT THE INVENTION

Although the preferred embodiments/examples are hereinafter presented for helping the understanding of the present disclosure, the following embodiments/examples are provided for illustration only and the scope of the present disclosure is not limited to the following embodiments/examples.

Example 1

1-1. Manufacture of a Negative Electrode Having an Organic Porous Coating Layer 96 weight % of carbon powder as a negative electrode active material, 3 weight % of polyvinylidene fluoride (PVdF) as a binder, and 1 weight % of carbon black as a conducting material were added to a solvent, N-methyl-2- pyrrolidone (NMP), to prepare a mixed negative electrode slurry. The mixed negative electrode slurry was applied to a negative electrode current collector of copper (Cu) thin film with 10 µm thickness, and dried to manufacture a negative electrode having a negative electrode active material layer, followed by roll pressing.

Subsequently, 98 parts by mass of polyethylene particles and 2.0 parts by mass of acrylic binder were mixed and dissolved in distilled water, yielding an organic porous coating layer slurry. The slurry was applied to the surface of the negative electrode active material layer by a doctor blade method and dried to form a coating layer such that the organic particles were present in an amount of 2 g/m².

1-2. Manufacture of a Positive Electrode Having an Inorganic Porous Coating Layer 92 weight % of lithium cobalt composite oxide ($LiCoO_2$) as a positive electrode active material, 4 weight % of carbon black as a conducting material, and 4 weight % of PVdF as a binder were added to a solvent, N-methyl-2-pyrrolidone (NMP), to prepare a positive electrode slurry. The positive electrode slurry was applied to a positive electrode current collector of aluminum (Al) thin film with 20 µm thickness and dried to manufacture a positive electrode having a positive electrode active material layer, followed by roll pressing.

PVdF-CTFE (polyvinylidene fluoride-chlorotrifluoroethylene copolymer) polymer was added in an amount of about 5 weight % to acetone and dissolved at 50° C. for about 12 hours or longer to prepare a polymer solution. Alumina ($Al_2O_3$) powder was added to the prepared polymer solution at the concentration of 20 weight % solids, and pulverized and dispersed for 12 hours or longer using a ball mill method to prepare a slurry. The particle size of alumina in the prepared slurry can be controlled based on the size (particle size distribution) of beads used in the ball mill and the ball mill time, and in example 1, alumina was pulverized with the particle size of about 500 nm to prepare a slurry forming an inorganic porous coating layer. Subsequently, the slurry for forming an inorganic porous coating layer was coated on the surface of the positive electrode active material layer by a dip coating method, such that about 2 g/m² of inorganic particles were formed on the positive electrode active material layer.

1-3. Manufacture of a Lithium Secondary Battery

The organic porous coating layer of the negative electrode and the inorganic porous coating layer of the positive electrode manufactured as described above were assembled using a stacking method such that they face each other, and a general polyolefin based separator was not used. An electrolyte solution (ethylene carbonate (EC)/propylene carbonate (PC)/diethyl carbonate (DEC)=30/20/50 weight %, lithium hexafluorophosphate ($LiPF_6$) 1 mole) was injected into the assembled battery to manufacture a lithium secondary battery.

Example 2

Except that the slurry for forming an organic porous coating layer was coated on the negative electrode active material layer such that 4 g/m² of organic particles are formed on the surface of the negative electrode active material layer, a lithium secondary battery was manufactured by the same method as example 1.

Comparative Example 1

Except that an organic porous coating layer was not formed on the surface of the negative electrode active material layer, an electrode and a battery were manufactured by the same method as example 1.

Experimental Example 1

Performance Evaluation of Lithium Secondary Batteries

Figure 2A:
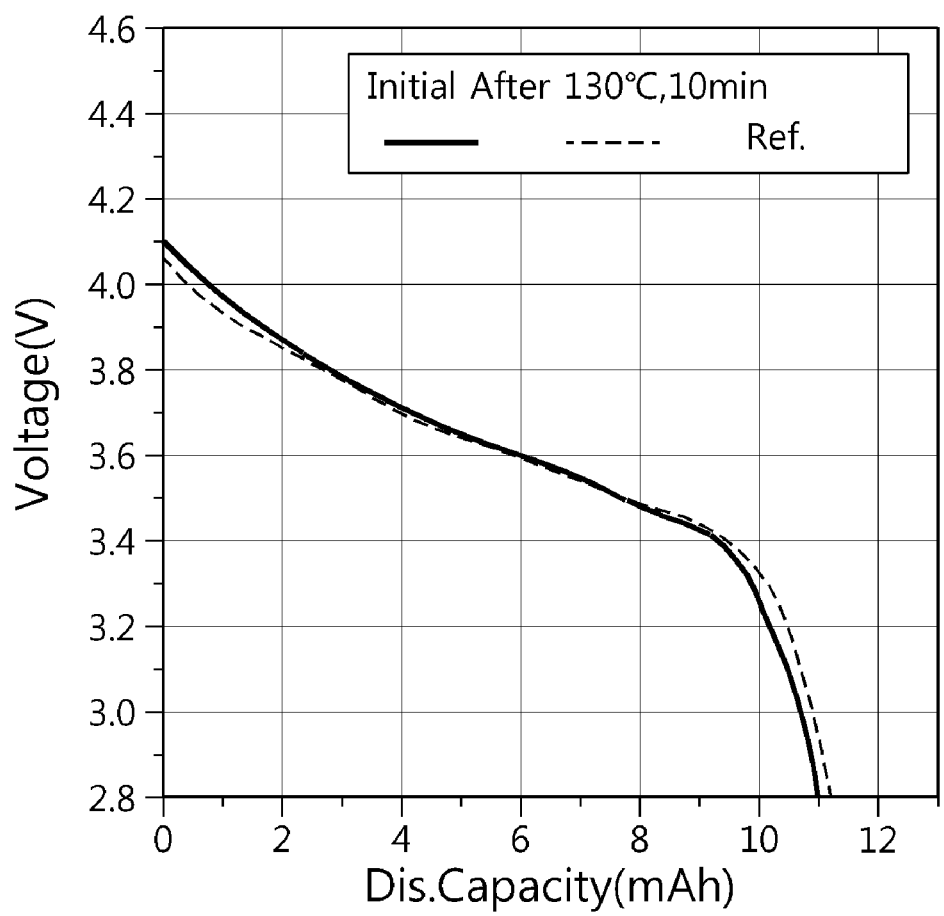
FIG. 2a is a graph showing the capacity of comparative example 1 when discharged at the discharge rate of 0.2 C after leaving at room temperature (solid line) and high temperature for 30 minutes (dashed line)
Figure 2B:
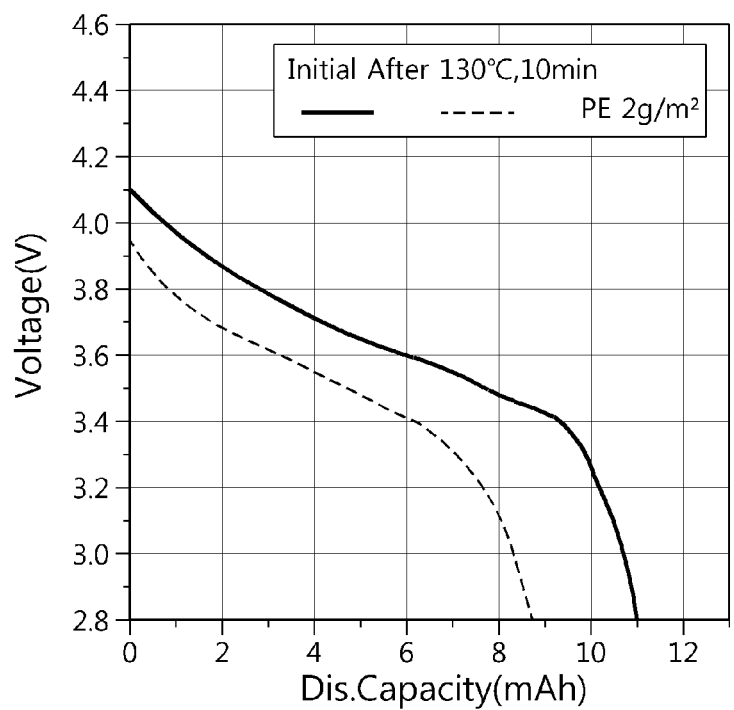
FIG. 2b is a graph showing the capacity of example 1 when discharged at the discharge rate of 0.2 C after leaving at room temperature (25° C., solid line) and high temperature for 30 minutes (130° C., dashed line)
Figure 2C:
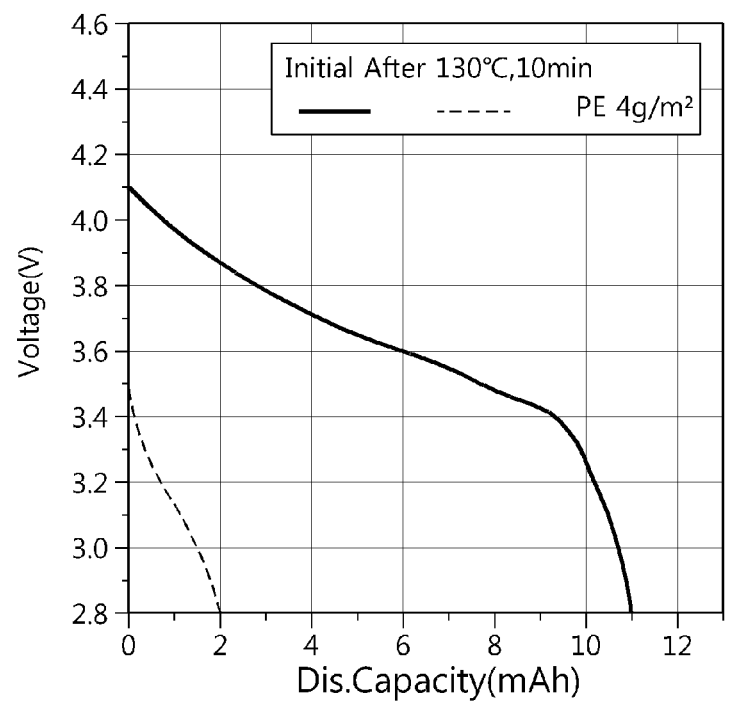
FIG. 2c is a graph showing the capacity of example 2 when discharged at the discharge rate of 0.2 C after leaving at room temperature (solid line) and high temperature for 30 minutes (dashed line).

For each lithium secondary battery having the battery capacity of 11.0 mAh prepared in examples 1 and 2 and comparative example 1, capacity was measured during charging and discharging at the discharge rate of 0.2 C at room temperature, and its results were plotted as solid line graphs in FIGS. 2a to 2c. From this, it could be seen that the lithium secondary batteries of examples 1 and 2 and comparative example 1 all achieved the design level of capacity.

Subsequently, the lithium secondary batteries were kept at 130° C. for 30 minutes, and after then, were discharged discharge rate of 0.2 C again. As a result, it was found from the dashed line graphs of FIGS. 2b and 2c that the lithium secondary batteries of examples 1 and 2 showed improved safety even when exposed to high temperature environment because charging and discharging was limited by a desired shut down effect, but it could be seen that the lithium secondary battery of comparative example 1 showed similar charging/discharging behaviors to those of room temperature (solid line graph) at high temperature (dashed line graph) of FIG. 2a, and safety of the lithium secondary battery was not improved.

What is claimed is:
1. A lithium secondary battery comprising:
an electrode assembly comprising:
a positive electrode consisting of a positive electrode current collector, a positive electrode active material layer, and a first porous coating layer stacked in a sequential order, wherein the first porous coating layer is directly coated on a surface of the positive electrode and laminated for bonding; and
a negative electrode consisting of a negative electrode current collector, a negative electrode active material layer, and a second porous coating layer stacked in a sequential order, wherein the second porous coating layer is directly coated on a surface of the negative electrode and laminated for bonding,
wherein the first porous coating layer or the second porous coating layer is an organic porous coating layer, and the other is an inorganic porous coating layer, and
the organic porous coating layer and the inorganic porous coating layer face each other,
wherein the inorganic porous coating layer comprises inorganic particles and an organic binder polymer, and
the organic porous coating layer comprises organic particles and is free of inorganic particles,
wherein the electrode assembly does not contain a free standing film type separator, and
wherein the organic particles are formed from at least one selected from the group consisting of high density polyethylene, low density polyethylene, linear low density polyethylene, polypropylene, high crystalline polypropylene, polyethylene-propylene copolymer, poly- ethylene-butylene copolymer, polyethylene-hexene copolymer, polyethylene-octene copolymer, polystyrene-butylene-styrene copolymer, polystyrene-ethylene-butylene-styrene copolymer, polystyrene, polyphenylene oxide, polysulfone, polycarbonate, polyester, polyurethane, polyacrylate, polyvinylidene chloride, polyvinylidene fluoride, polysiloxane, polyolefin ionomer, polymethyl pentene, hydrogenated oligocyclopentadiene (HOCP), and their derivatives.

2. The electrode assembly according to claim 1, wherein organic particles that make up the organic porous coating layer have a melting point of 180° C. or less.

3. The electrode assembly according to claim 1, wherein the organic porous coating layer is coated in an amount of between 0.1 and 7 g/m² on a surface of the electrode active material layer.

4. The electrode assembly according to claim 1, wherein the inorganic porous coating layer includes inorganic particles having a dielectric constant of 5 or higher, inorganic particles having an ability to transport lithium ions, or their mixtures.

5. The electrode assembly according to claim 4, wherein the inorganic particles having a dielectric constant of 5 or higher are $BaTiO_3$, $Pb(Zr,Ti)O_3$ (PZT), $Pb_{1-x}La_xZr_{1-y}Ti_yO_3$ (PLZT), $PB(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, or their mixtures.

6. The electrode assembly according to claim 4, wherein the inorganic particles having an ability to transport lithium ions are lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ based glass ($Li_xSi_yS_z$, $0<x<3$, $0<y<2$, $0<z<4$), $P_2S_5$ based glass ($Li_xP_yS_z$, $0<x<3$, $0<y<3$, $0<z<7$), or their mixtures.

7. The electrode assembly according to claim 1, wherein the inorganic porous coating layer is coated in an amount of between 1 and 30 g/m² on a surface of the electrode active material layer.

8. The electrode assembly according to claim 1, wherein the inorganic particles have a diameter in a range of between 0.1 and 1.0 μm, and the organic particles have a diameter in a range of between 0.05 and 1.0 μm.

* * * * *